United States Patent
Sawano et al.

(10) Patent No.: US 7,589,940 B2
(45) Date of Patent: Sep. 15, 2009

(54) VOLTAGE BOOSTING CIRCUIT AND ELECTRICITY-DRIVEN POWER STEERING DEVICE

(75) Inventors: Takamoto Sawano, Kasugai (JP); Keita Gunji, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 536 days.

(21) Appl. No.: 11/385,974

(22) Filed: Mar. 21, 2006

(65) Prior Publication Data
US 2007/0000718 A1     Jan. 4, 2007

(30) Foreign Application Priority Data
Jun. 29, 2005    (JP) ............... 2005-189539

(51) Int. Cl.
*H02H 7/08* (2006.01)
*H02H 9/00* (2006.01)

(52) U.S. Cl. ................ 361/18; 361/155; 361/156

(58) Field of Classification Search ............. 361/18, 361/155, 156
See application file for complete search history.

(56) References Cited

U.S. PATENT DOCUMENTS 5,758,741 A    6/1998  Tomioka 6,411,488 B1 *  6/2002  Nishiwaki ............... 361/160
6,960,903 B2    11/2005  Yamamoto

FOREIGN PATENT DOCUMENTS

JP      3205651       6/2001

* cited by examiner

*Primary Examiner*—Stephen W Jackson
*Assistant Examiner*—Zeev Kitov
(74) *Attorney, Agent, or Firm*—Osha • Liang LLP

(57) ABSTRACT

A switching device of a chopper circuit is interrupted from a switching circuit when the switching device has a breakdown, whereby power source input is directly output without being boosted by chopper operation. A motor controller provided to ECU of an electrically-driven power steering device is equipped with a chopper circuit for carrying out a voltage boosting operation, a detection circuit for detecting a failure of a first switching device TR1 in the chopper circuit, and an interrupting relay switch. A controller carries out ON/OFF control on the first switching device, and when the detection circuit detects the failure of the switching device, the controller turns off the interrupting relay switch, and separates the first switching device from the chopper circuit. At this time, the battery voltage Vin is output as an output voltage Vout without being boosted by the chopper circuit.

5 Claims, 5 Drawing Sheets

VOLTAGE BOOSTING CIRCUIT AND ELECTRICITY-DRIVEN POWER STEERING DEVICE

BACKGROUND OF THE INVENTION

1. Field of the Invention

The present invention relates to a voltage boosting circuit using a chopper circuit, and an electrically-driven power steering device using the voltage boosting circuit.

2. Description of Related Art

An electrically-driven power steering device has advantages that no hydraulic system is used, a structure for assisting the steering control force through motor driving is simplified, the fuel consumption can be improved because the motor is driven only when it is required, and the steering control force can be made heavier or lighter in accordance with the vehicle speed.

In the electrically-driven steering device as described above, the power supply voltage of an in-vehicle mount battery is supplied to the motor through an electrical control circuit, and the magnitude of the current is controlled in accordance with the driving state of the vehicle. Specifically, the electrical control circuit detects steering (steering speed, steering torque) and outputs a proper control signal by referring to a preset steering sensitive characteristic (a characteristic for controlling the magnitude of supply power in accordance with steering), and detects a vehicle speed and outputs a proper control signal by referring to a preset vehicle speed sensitive characteristic (a characteristic for controlling the magnitude of supply power in accordance with the vehicle speed). The electrically-driven power steering device reduces the steering assist force (steering assisting force) in connection with increase of the vehicle speed, or increases the steering assist force in connection with increase of the steering speed or steering torque.

Current flowing in the electric control circuit of the electrically-driven power steering is normally varied in the range from several amperes to several tens amperes in accordance with the magnitude of the load at the auxiliary assist time, and there is a case where voltage drop caused by a current control element (for example, a switching device such as MOSFET or the like) or a wire cable cannot be neglected when large current is supplied to the motor, for example, when a steering wheel is turned back at the parking time, a vehicle runs at a super-slow speed or the like. That is, this voltage drop remarkably reduces the current supply efficiency with the voltage drop of the input voltage of the motor, and also it is impossible to supply necessary current to the motor, so that the steering assist cannot be sufficiently performed.

Therefore, JP-A-8-127350 (Patent Document 1) has proposed a device in which the power supply voltage is boosted by a chopper circuit and which is equipped with means for controlling the magnitude of the voltage to be boosted in accordance with the vehicle speed or steering.

Furthermore, Japanese Patent No. 3205651 (Patent Document 2) has proposed a device in which a double voltage power supply circuit including two switching devices and two capacitors connected in a bridge style is used, and the ON/OFF duty ratio of the switching devices is changed in accordance with the vehicle speed or steering to control the magnitude of the output voltage to a predetermined voltage higher than the power supply voltage.

Still furthermore, JP-A-2005-51951 (Patent Document 3) has proposed a device for disconnecting an inductor and a power source from each other and carrying out a predetermined failure judgment when short-circuiting failure or open failure judgment of a switching device is carried out in a voltage boosting circuit using a chopper circuit.

However, in the device disclosed in the Patent Document 1, when the switching device of the chopper circuit suffers closed-circuit failure, it falls into an output short-circuit state, so that the output of the power source is not supplied to the motor side.

With respect to the chopper circuit used in the electrically-driven power steering device, current of several amperes to several tens amperes flows as described above, and thus even when a switching device having a high withstanding voltage (power MOSFET or the like) is used, the chopper circuit may be broken in accordance with permissible withstanding quantity of the switching device when there occurs a situation that large current of about several tens amperes flows for a long term. When the switching device of the chopper circuit suffers short-circuiting failure and thus the output of the power source is not supplied to the motor side, the steering assist force is suddenly reduced to zero, so that the steering operation becomes very heavy suddenly. For example, if the switching device suffers short-circuiting failure when a vehicle starts its movement from the stop state under the state that it is located at a turn-right lane before an intersection, the steering operation to the right side becomes remarkably heavy, so that it may be impossible to sufficiently carry out the steering operation.

The Patent Document 2 is different from the Patent Document 1 in that a bridge-connection switching circuit is constructed. However, even with this circuit construction, any one of two switching devices may have a breakdown by large current, and if it has a breakdown, the power source output is prevented from being supplied to the motor side by a safety circuit.

The Patent Document 3 discloses that the short-circuiting or open failure judgment of the switching device of the chopper circuit is efficiently carried out. However, it is considered that under the failure the power source output is not supplied to the motor side.

SUMMARY OF THE INVENTION

The invention has an object to provide a voltage boosting circuit with which steering assist can be continually performed even when a switching device of a chopper circuit has a breakdown, and an electrically-driven power steering device using the voltage boosting circuit.

According to the invention, a power supply voltage is boosted by a chopper circuit in which an inductor and a switching device are connected to each other in series and a smoothing capacitor is connected to the connection point between the inductor and the switching device through a rectifying element. In the chopper circuit, the switching device is turned on/off, whereby the energy accumulated in the inductor at the ON-time of the switching device is discharged to the smoothing capacitor at the OFF-time of the switching device. Therefore, by setting the ON-time to be longer than the OFF-time, the power supply voltage corresponding to the input voltage of the chopper circuit can be boosted and then output.

In the invention, a failure detecting circuit for detecting a failure of the switching device is provided. In the failure detecting circuit, for example, a current detecting resistor is connected to the input side of the power supply voltage in series, and it is checked by monitoring the voltage across the resistor whether the power source input current is under an eddy current state (abnormal current state), thereby detecting the presence or absence of a failure. There is provided a interrupting circuit for interrupting the switching device from the inductor on the basis of a signal when the failure detecting circuit detects the failure of the switching device. When the switching device is interrupted from the inductor as described above, the power source input current is directly output with suffering no action from the inductor, so that the power supply voltage is directly output without being boosted. The interrupting circuit of the invention contains not only a switch, a fuse or the like, but also a circuit for substantially interrupting a circuit such as a posistor having a high resistance value or the like.

Accordingly, even when the switching device has a breakdown, the motor connected to the output side of the switching device is supplied with a voltage, and thus the driving of the motor is not stopped although the output thereof is low.

Therefore, the disadvantage that the steering assist force is suddenly reduced to zero when the switching device of the chopper circuit has a breakdown can be prevented by installing the above voltage boosting circuit into an electrically-driven power steering.

According to the invention, when the switching device of the chopper circuit has a breakdown, a voltage can be continually supplied to a load even when the output thereof is low.

DESCRIPTION OF PREFERRED
EMBODIMENTS

Figure 1:
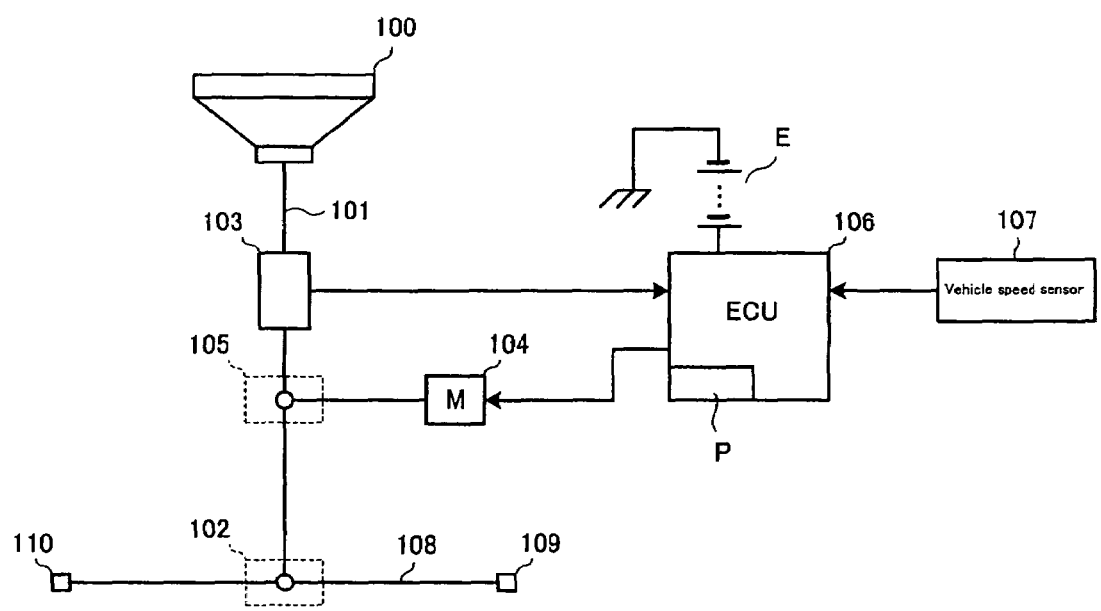
FIG. 1 is a diagram showing the construction of an electrically-driven power steering device according to an embodiment of the invention.

FIG. 1 is a diagram showing the construction of an electrically-driven power steering device according to an embodiment of the invention.

The electrically-driven power steering device is equipped with a steering wheel 100 for steering, a steering shaft 101 fixed to the steering wheel 100 at one end thereof, a rack pinion mechanism 102 joined to the other end of the steering shaft 101, a torque sensor 103 that is provided to some midpoint of the steering shaft 101 and detects a steering torque applied to the steering shaft 101 by operating the steering wheel 100, and a worm wheel mechanism 105 for applying the rotational driving force of the motor 104 to the steering shaft 101 as steering assist force (steering assisting force).

The torque sensor 103, a motor 104 and a vehicle speed sensor 107 are connected to an electric control unit (ECU) 106 of a vehicle, and ECU 106 controls the driving current of the motor 104 on the basis of the detection signals of the torque sensor 103 and the vehicle speed sensor 107. ECU 106 contains a motor controller P, and has a voltage boosting control function of boosting the voltage of 12V battery E to 200V at maximum and a motor driving voltage forming function of forming a driving voltage for the motor 104.

A tie rod 108 is connected to a steering gear box 102, and tie rod ends 108, 109 to be joined to wheels (not shown) are provided to both the ends of the tie rod 108.

In the above construction, ECU 106 refers to a preset table on the basis of the detection signal of the steering torque achieved from the torque sensor 103 when the steering is carried out by the steering wheel 100 and the detection signal of the vehicle speed achieved from the vehicle speed sensor 107 and applies the motor driving voltage corresponding to the detection signals to the motor 104.

Accordingly, the steering assist force is applied to the steering shaft 101 by the motor 104.

In this embodiment, the motor driving voltage is applied to the motor 104 on the basis of the steering torque and the vehicle speed, however, the motor driving voltage may be simply formed on the basis of only the steering torque because the steering torque correlates with the vehicle speed.

Figure 2:
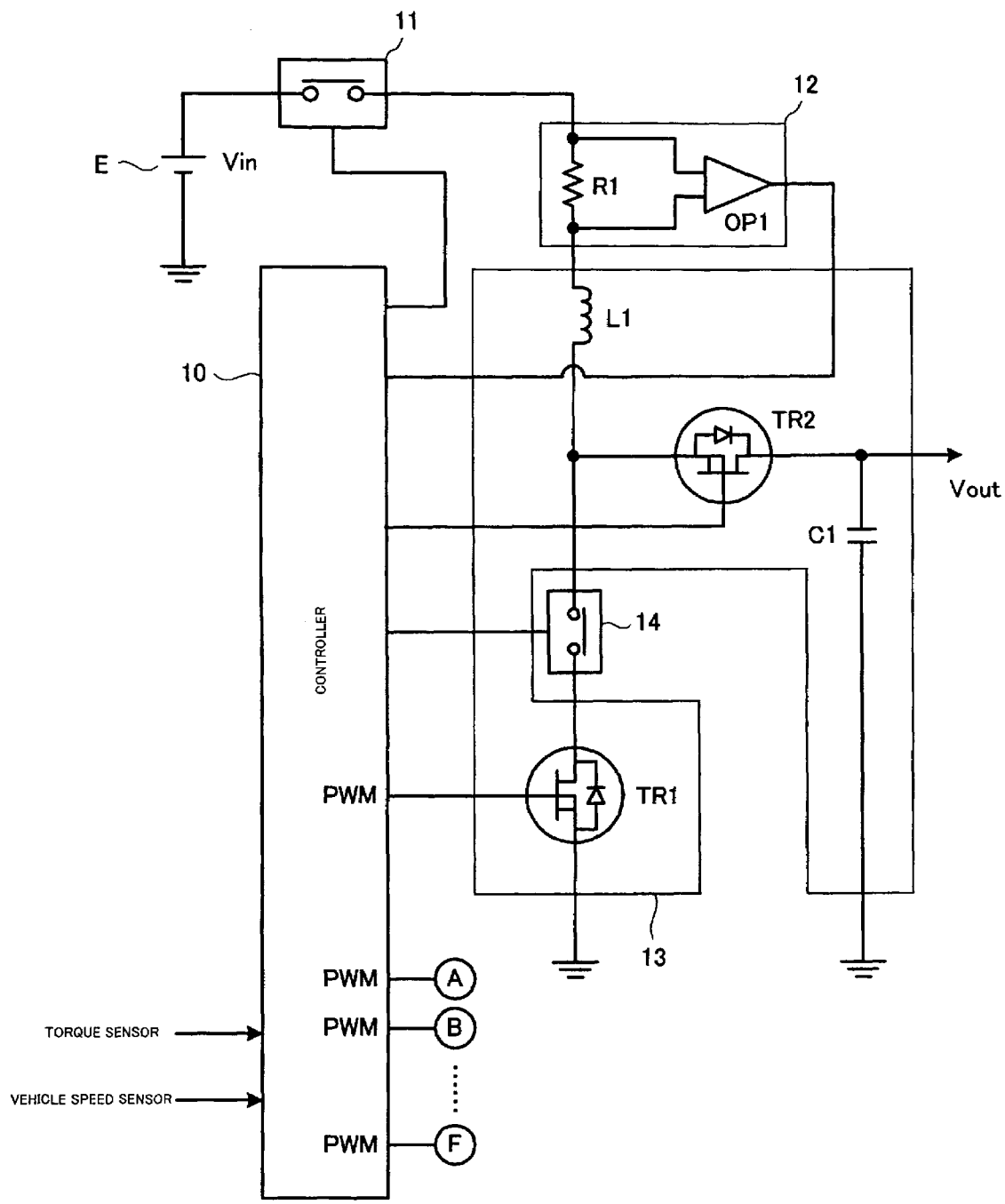
FIG. 2 is a diagram showing the circuit construction of a motor controller P.
Figure 3:
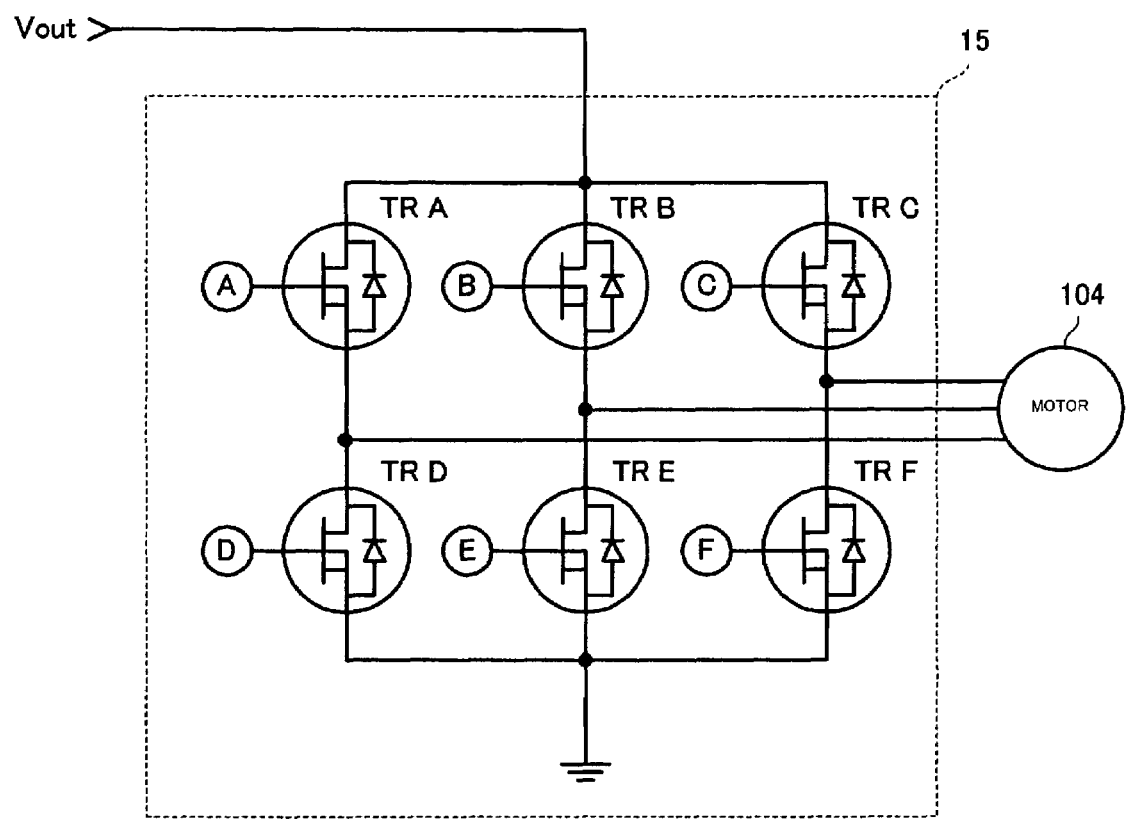
FIG. 3 is a diagram showing the construction of a motor driving circuit.

FIG. 2 is a diagram showing the circuit construction of the motor controller P. FIG. 3 shows a motor driving circuit.

A battery E in the vehicle is connected to the chopper circuit 13 through an ignition switch 11 and a failure detecting circuit 12. The chopper circuit 13 is constructed by an inductor L1, a first switching device TR1 comprising a power MOSFET, a second switching device TR2 connected to the connection point between the inductor Li and the first switching device TR1, and a smoothing capacitor C1 connected to the output side of the second switching device TR2. The control terminal (gate terminal) of the switching device TR1 is connected to a controller 10. The failure detecting circuit 12 comprises a current detecting resistor R1 connected between the inductor L1 and the ignition switch 11, and an operation amplifier OP1 for detecting the voltage across both the ends of the resistor R1, and the output signal of the operation amplifier OP1 is input to the controller 10.

An interrupting relay switch 14 is connected between the inductor L and the first switching device TR1, and the ON/OFF control thereof is carried out by the controller 10. Furthermore, the boosted output voltage Vout is output from the smoothing capacitor C1, and applied to the motor driving circuit 15 (see FIG. 3).

In the above construction, when the ignition switch 11 is turned on, the controller 10 subjects the switching device TR1 to PWM control to thereby carry out voltage boosting control. Furthermore, the controller 10 monitors the signal from the failure detecting circuit 12. If the voltage detected by the resistor R1 is set to the magnitude corresponding to eddy current (abnormal current) in which the voltage concerned exceeds a preset value, the controller 10 regards the first switching device TR1 as suffering a short-circuiting failure, and turns off the relay switch 14, whereby the switching device is interrupted from the inductor.

The second switching element TR2 functions as a rectifying element when the energy accumulated in the inductor L1 is discharged to the smoothing capacitor C1. However, if the switching device TR2 is kept to ON-state when the load is large (when large current is supplied to the motor 104 because the steering torque is large), a part of the current flows from the power source into the smoothing capacitor C1 at the time when the energy is accumulated into the inductor L1 (the switching device TR1 is set to ON), and thus the efficiency is lowered. Therefore, in a case where the magnitude of the load is equal to a fixed value or more, the second switching device TR2 is controlled to be turned off when the first switching device TR1 is set to ON, and turned on when the first switching device TR1 is set to OFF. Conversely, in a case where the magnitude of the load is less than the fixed value, the relative rate of the switching loss of the second switching device TR2 when the energy is accumulated into the inductor L1 (the switching device TR1 is set to ON) is increased, and thus the switching device TR2 is controlled to be perfectly set to the ON state (diode state) in order to avoid the reduction of the efficiency.

The controller 10 refers to predetermined steering sensitive characteristic table and vehicle speed sensitive characteristic table, and outputs a PWM signal to the motor driving circuit 15 so as to achieve the steering assist force corresponding to the signals from the torque sensor 103 and the vehicle speed sensor 107.

As shown in FIG. 3, the motor driving circuit 15 is constructed by TRA to TRF of six power MOSFETs for driving the three-phase motor 104, and phase rotation control is carried out by the motor driving circuit 15. Since the magnitude of the motor torque can be controlled by controlling the current supply time of each power MOSFET, the control is carried out so that the steering assist force has a predetermined magnitude.

In the above construction, the interrupting relay switch 14 is set to ON at the normal time. At this time, the chopper circuit 13 carries out the operation of boosting the voltage Vin (12V) of the battery E. The controller 10 controls the ON/OFF duty ratio of the switching device TR1 to a proper value (PWM control) and carries out the ON/OFF operation of the first switching device TR1. On the other hand, when the failure detecting circuit 12 detects a short-circuiting failure of the switching device TR1 during the voltage boosting operation or during the stop of the operation, the controller 10 makes a judgment of abnormality, and turns off the relay switch 14. Therefore, the power supply voltage of the battery E is not boosted, and substantially directly supplied to the motor driving circuit 15 as an output voltage Vout (a voltage drop caused by the resistor R1 and the resistance component of the inductor L1 slightly exists).

On the other hand, at the normal time and the abnormal time, the controller 10 refers to the steering sensitive characteristic table and the vehicle speed sensitive characteristic table on the basis of the signals from the torque sensor 103 and the vehicle speed sensor 107 to form PWM signals (A) to (F), and outputs these PWM signals to the motor driving circuit 15. In this embodiment, as described below, the above tables are changed at the abnormal time when the boosting operation is stopped.

Figure 4:
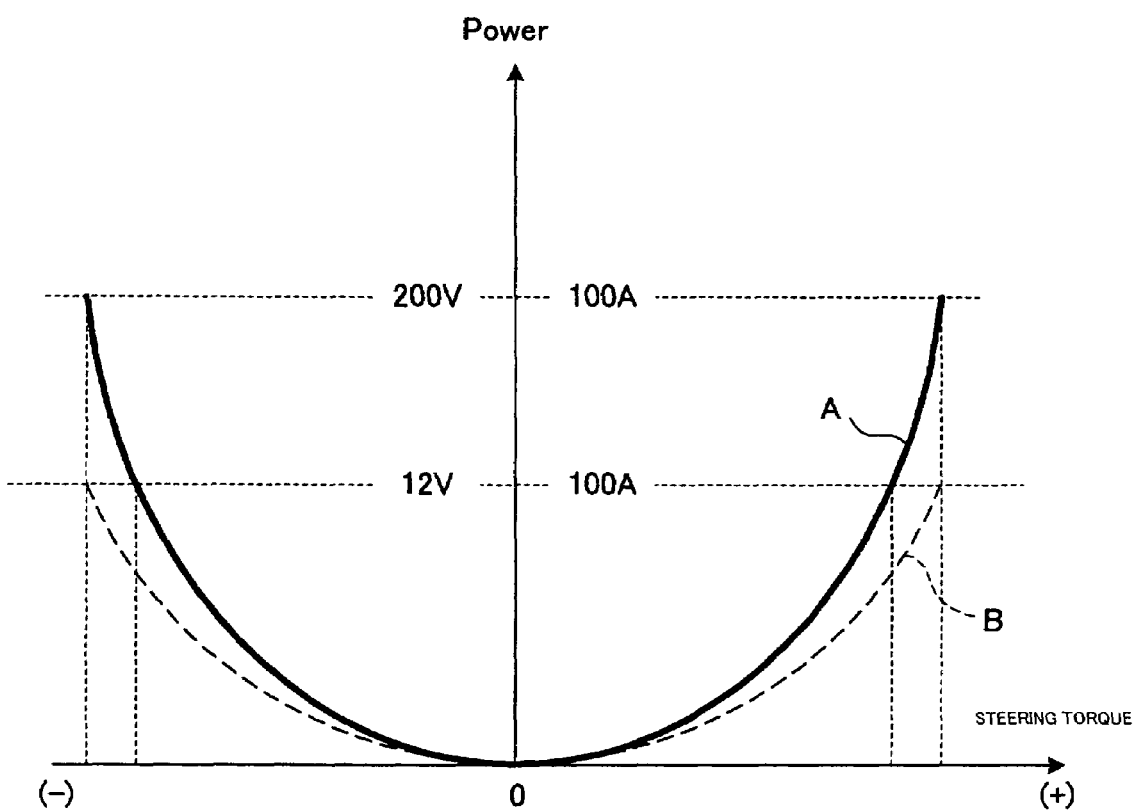
FIG. 4 is a diagram showing a steering sensitive characteristic table which is represented as a characteristic curve.

In order to simplify the description, it is assumed that the PWM signals (A) to (F) are formed on the basis of only the steering torque. In this case, the steering sensitive characteristic table is referred to. FIG. 4 shows the steering sensitive characteristic table represented as a characteristic curve. The abscissa axis represents the steering torque, and the ordinate axis represents the power (power) supplied to the motor 104 by the PWM signals (A) to (F). A curved line A represents a characteristic curve at the normal time (when the boosting operation is carried out), and a curved line B represents a characteristic curve at the abnormal time (when no boosting operation is carried out). In the curved line A, the maximum power supplied to the motor 104 is equal to 200V×100 A. That is, if the boosted voltage is set to 200V, the PWM signals (A) to (F) are controlled so that the motor current (average value) is equal to 100 A when the steering torque is maximum. The PWM signals (A) to (F) are controlled so that the supplied power is varied substantially like a quadratic curve between the time when the steering torque is maximum and the time when the steering torque is minimum.

On the other hand, in the curved line B, the maximum power supplied to the motor 104 is equal to 12V×100 A. That is, since no boosting operation is carried out, the PWM signals (A) to (F) are controlled so that's the voltage applied to the motor 104 is equal to the battery voltage of 12V, the motor current (average value) when the steering torque is maximum is equal to 100 A, and the supplied power is smaller than the curved line A between the maximum steering torque and the minimum steering torque.

The characteristic curve is varied between the normal time and the abnormal time in order to enhance the safety at the steering operation time. If the control is carried out like the curved line A at the abnormal time, no large problem occurs under a condition that the steering torque is small. However, in a case where a large steering torque occurs at the abnormal time, for example, in a case where abrupt steering is carried out, if the control based on the curved line A is carried out, sufficient power can not be supplied because the voltage applied to the motor is a non-boosted low voltage. In this case, an operator may pay no attention to whether abnormality occurs or not, and as a result, the operator cannot turn a steering wheel as he/she intended although the operator carries out the operation of abruptly turning the steering wheel, so that an accident may occur. Therefore, by switching the curved line A to the curved line B at the abnormal time like this embodiment, the operator can feel the reduction of the steering assist force at the steering time irrespective of the magnitude of the steering torque, and thus the operator can be informed of the abnormal state. Accordingly, the operator can carry out steering with larger force at the abnormal time than at the normal time, and thus occurrence of an accident can be prevented.

In FIG. 4, the right side from the center position on the abscissa axis represents the steering torque when the steering wheel is clockwise turned (+direction), and the left side represents the steering torque when the steering wheel is counterclockwise turned. The characteristic curve is symmetrical bilaterally. In the foregoing description, only the steering sensitive characteristic table is referred to. However, actually, the vehicle speed sensitive characteristic table is also referred to, and thus the vehicle speed is also set as a parameter in the characteristic curve of FIG. 4. That is, plural curved lines A, B of FIG. 4 exist with respect to the vehicle speed as a parameter, and the curved line corresponding to the vehicle speed at that time is selected from these plural curved lines for the control.

In the above construction, even when the first switching device TR1 of the chopper circuit 13 is broken and short-circuited during its operation, there can be prevented a situation that the steering assist force based on the motor 104 is suddenly reduced to zero and thus the vehicle falls into a risk state. Furthermore, the safety can be more enhanced by changing the steering sensitive characteristic table and the vehicle speed sensitive characteristic table for controlling the steering assist force at that time.

Figure 5:
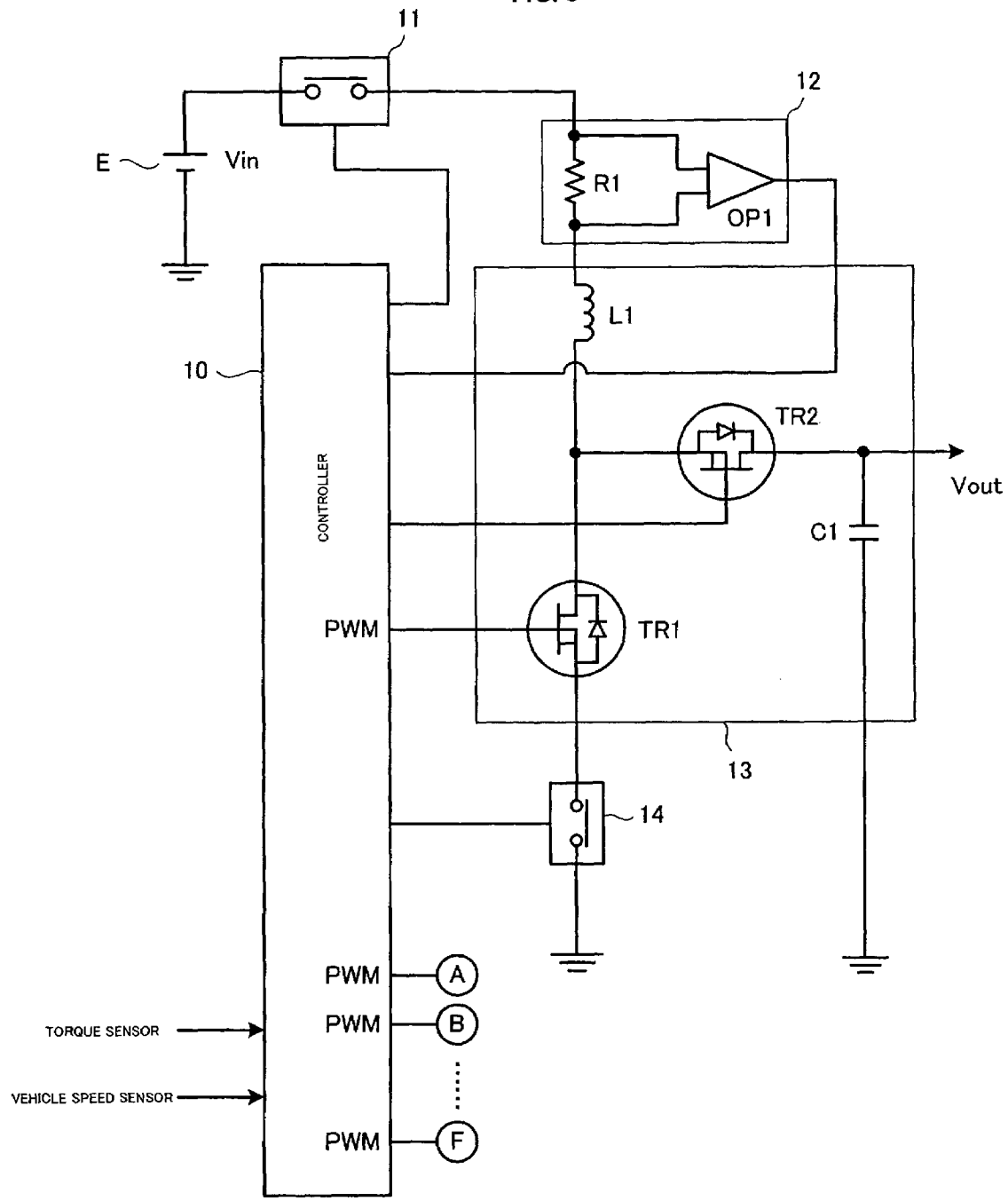
FIG. 5 is a diagram showing another embodiment of the invention.

FIG. 5 shows another embodiment of the invention.

In this construction, the different point from FIG. 2 resides in that the interrupting relay switch 14 is connected between the first switching device TR1 and the ground.

In such a construction, the battery voltage Vin can be directly output to the motor driving circuit 15 at the time when the boosting operation is stopped.

In the above-described embodiment, by detecting whether the current flowing into the resistance R1 connected to the inductor L1 in series is eddy current (abnormnal current), it is judged whether the first switching device TR1 is broken down. However, a temperature sensor (thermistor element) may be secured to the heat radiating portion of the first switching device TR1, and the breakdown of the first switching device TR1 may be judged when abnormal temperature is detected by the temperature sensor. Furthermore, in place of the relay, a semiconductor switching device may be used for the interrupting circuit.

What is claimed is:

1. A voltage boosting circuit comprising:
   a chopper circuit in which an inductor and a switching device are connected to each other in series and a smoothing capacitor is connected to a connection point between the inductor and the switching device through a rectifying element;
   a failure detecting circuit for detecting a failure of the switching device; and
   an interrupting circuit for interrupting the switching device from the inductor and substantially directly supplying a current from a power supply circuit to a motor on the basis of detection of the failure of the switching device by the failure detecting circuit.

2. A voltage boosting circuit comprising:
   a chopper circuit in which a grounded switching device and an inductor are connected to each other in series, and a smoothing capacitor is connected to a connection point between the grounded switching device and the inductor through a rectifying element;
   a failure detecting circuit for detecting a failure of the switching device; and
   an interrupting circuit for interrupting the switching device from the ground and substantially directly supplying a current from a power supply circuit to a motor on the basis of detection of the failure of the switching device by the failure detecting circuit.

3. An electrically-driven power steering device for supplying a motor with the power corresponding to the magnitude of a steering torque applied to a steering wheel to apply the steering assisting force corresponding to the magnitude of the steering torque to a steering mechanism, comprising:
   a voltage boosting circuit for boosting a voltage from a DC power supply circuit and applying the boosted voltage to the motor; and
   an abnormality detecting circuit for detecting abnormality of the voltage boosting circuit,
   wherein the voltage boosting circuit contains a voltage boosting stop circuit for stopping the voltage boosting operation thereof and supplying current from a power supply circuit to the motor when the abnormality detecting circuit detects abnormality of the voltage boosting circuit, and
   wherein when the abnormality detecting circuit detects abnormality of the voltage boosting circuit, the power to be supplied to the motor is reduced in accordance with the magnitude of the steering torque.

4. The voltage boosting circuit according to claim 1, wherein the interrupting circuit is connected between the switching device and the connection point.

5. The voltage boosting circuit according to claim 2, wherein the interruption circuit is connected between the switching device and the ground.

* * * * *